(12) United States Patent
Fukukawa (10) Patent No.: US 8,511,235 B2
(45) Date of Patent: Aug. 20, 2013

(54) LINEAR TRANSPORT DEVICE

(75) Inventor: Yoshiaki Fukukawa, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 314 days.

(21) Appl. No.: 12/914,485

(22) Filed: Oct. 28, 2010

(65) Prior Publication Data

US 2011/0100252 A1 May 5, 2011

(30) Foreign Application Priority Data

Nov. 4, 2009 (JP) ................................. 2009-252852

(51) Int. Cl.
*B60L 13/03* (2006.01)
(52) U.S. Cl.
USPC ............................ 104/293; 104/292; 104/294
(58) Field of Classification Search
USPC ................. 104/284, 293, 292, 281, 282, 294; 105/77, 78, 72.2
See application file for complete search history.

(56) References Cited

U.S. PATENT DOCUMENTS

| | | | | |
|---|---|---|---|---|
| 3,602,786 A | * | 8/1971 | Izhelya et al. | 318/135 |
| 3,763,789 A | * | 10/1973 | Olson et al. | 105/72.2 |
| 3,927,620 A | * | 12/1975 | Clapham | 104/282 |
| 4,331,225 A | * | 5/1982 | Bolger | 191/10 |

FOREIGN PATENT DOCUMENTS

JP 2001-341841 A 12/2001

* cited by examiner

*Primary Examiner* — Mark Le
(74) *Attorney, Agent, or Firm* — Studebaker & Brackett PC (57) ABSTRACT

Disclosed is a linear transport device. A platform car of the linear transport device is detachably mounted on a rail fixed to a base in an opposing direction along which the platform car faces the mounting surface of the base. A linear motor that drives the platform car is provided. The linear motor includes a stator disposed on the base and a mover disposed on the platform car so as to face the stator. One of the stator and the mover is a permanent magnet, and the other is an electromagnet. A relative position variable mechanism for relatively displacing the stator and the mover so as to reduce the magnetic suction force generated between the stator and the mover is provided.

4 Claims, 5 Drawing Sheets

LINEAR TRANSPORT DEVICE

BACKGROUND OF THE INVENTION

1. Field of the Invention

The present invention relates to a linear transport device which uses a linear motor as its drive source.

2. Description of the Related Art

A linear transport device of this type is provided with a base, rails that are laid on the base, and a platform car that moves on and along the rails. In order to drive the platform car, a linear motor has been conventionally used as the drive source. A well-known linear motor is provided with a stator fixed to the foregoing base, and a mover fixed to the platform car. With respect to the stator and the mover, one is a permanent magnet and the other is an electromagnet. By controlling current supply to the coil of the electromagnet, the propulsion is generated to the platform car based on the mutual effect of the magnetic flux between the stator and the mover.

The platform car is configured such that it is mounted on the rails and is only allowed to move in the longitudinal direction thereof. Accordingly, during maintenance, standard practice is to move the platform car to the device end and remove the platform car by pulling the platform car in the longitudinal direction from the rail end.

For example, Japanese unexamined Patent Application No. 2001-341841 discloses a linear transport device in which a part of the base is adapted to be slidable in the width direction together with the rails and the stator. In this prior art, by sliding the platform car together with a part of the base, the platform car can be removed at a portion that is midway in its range of motion.

In order to pull out the platform car in the foregoing conventional linear transport device, space is required around the device on the surface to which the base is mounted. If it is not possible to have sufficient space around the device, it will be detrimental to the removal of the platform car. Moreover, with types where the platform car is pulled out from the rail end, a disassembly operation of removing parts such as a stopper that is fixed to the rail terminal part is required.

Accordingly, what is required is a linear transport device with favorable maintenance performance which is capable of easily removing the platform car with fewer processes without having wide space around the device.

SUMMARY OF THE INVENTION

The present invention is provided with a rail fixed to a base, a platform car movably supported on the rail, and a linear motor that drives the platform car. The linear motor includes a stator disposed on the base and a mover disposed on the platform car so as to face the stator. One of the stator and the mover is a permanent magnet, and the other is an electromagnet with a coil. The platform car of the present invention is detachable from the rail in an opposing direction along which the platform car faces a surface of the base to which the rail is fixed. Nevertheless, since the stator of the base and the mover of the movable assembly are magnetically pulling to each other even in a state where the supply of alternating current is suspended, it is difficult to pull away the platform car and remove it from the rail in an assembled state. As a result of intense study, the present inventors resolved the foregoing problem by providing a mechanism for reducing the magnetic suction force working between the stator and the mover in a state of not energizing the coil, and thereby completed this invention.

These and other objects, features and advantages of the invention will become more apparent upon reading the following detailed description along with the accompanying drawings.

DETAILED DESCRIPTION OF THE PREFERRED EMBODIMENTS OF THE INVENTION

Preferred embodiments of the present invention are now explained with reference to the attached drawings.

Figure 1:
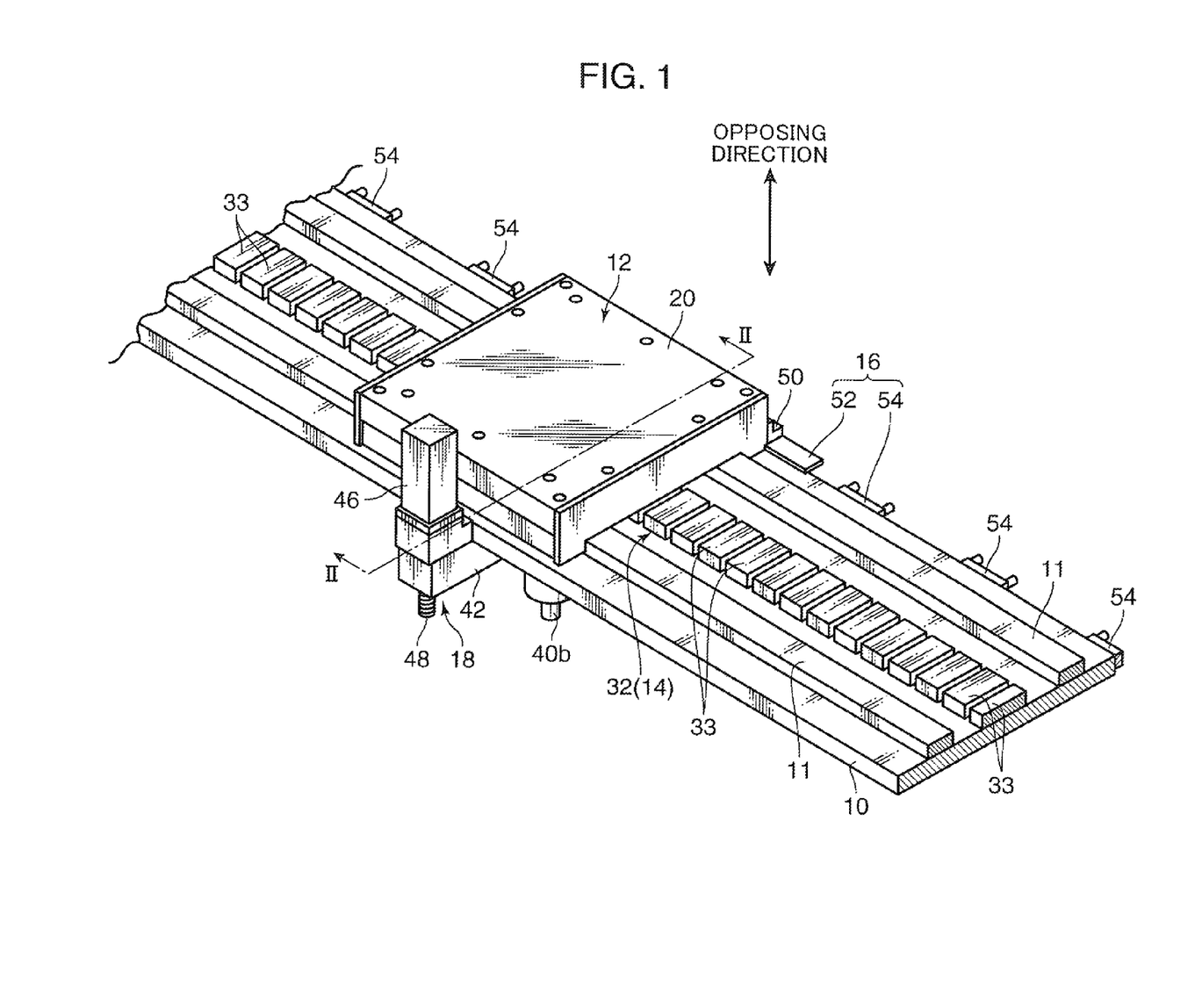
FIG. 1 is a perspective view showing the linear transport device (first embodiment) according to the present invention.
Figure 2:
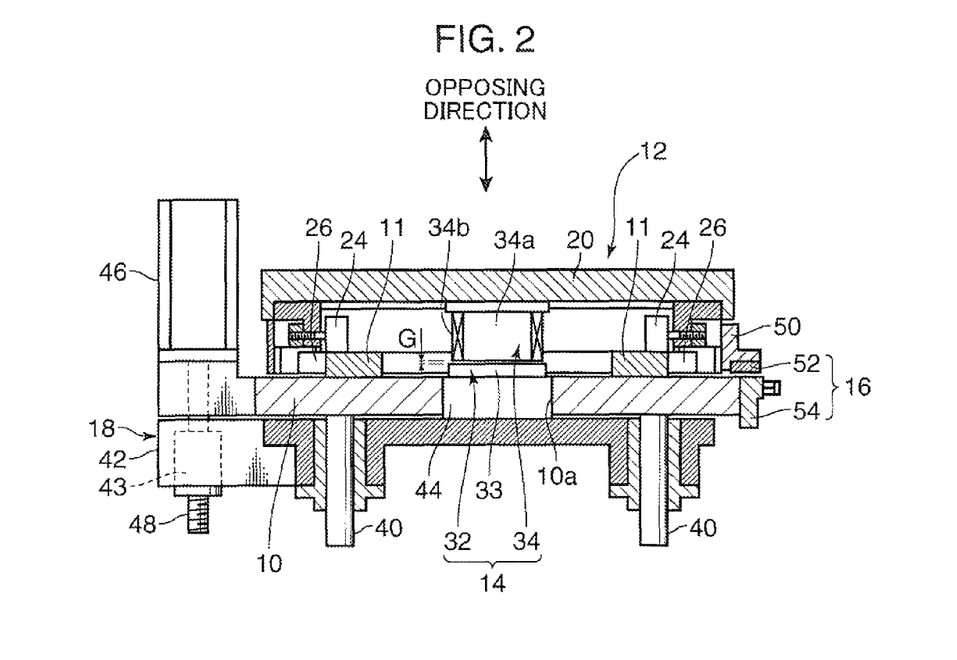
FIG. 2 is a longitudinal cross section (during normal operation) of the linear transport device.

FIGS. 1 and 2 show the linear transport device according to the first embodiment of the present invention, wherein FIG. 1 is a perspective view showing the linear transport device and FIG. 2 is a longitudinal cross section (cross section of line II-II of FIG. 1) of the linear transport device, respectively. As shown in these Figures, the linear transport device includes a base 10 that is disposed horizontally, a pair of linear rails 11 fixed on the base and extending in alignment in a mutually parallel manner, a platform car 12 which is movably supported on the rails 11, a linear motor 14 for driving the platform car 12, a position detection device 16 of the platform car 12, and a gap variable mechanism 18.

Each of the rails 11 has a square cross section, which is, for example, a rectangular cross section.

Referring to FIG. 2, the platform car 12 is provided with a rectangular platform body 20 in a planar view.

Figure 3:
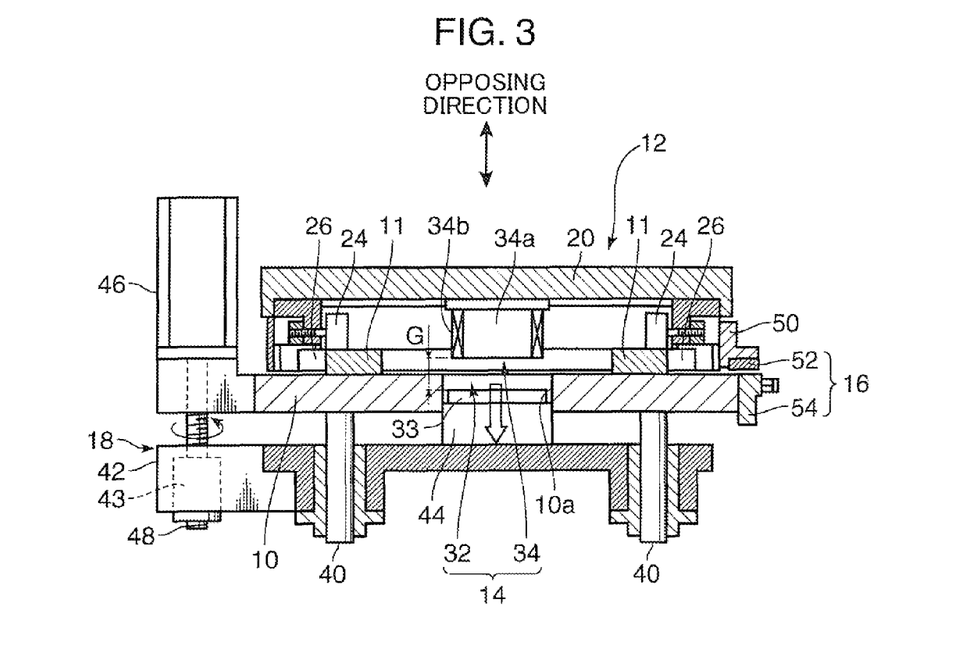
FIG. 3 is a longitudinal cross section (in process of removing the platform car) of the linear transport device.

The platform body 20 is provided with a plurality of first guide rollers 24 supported rotatably around a horizontal axis that is orthogonal to the rails 11 and which come in contact with the upper surface of the respective rails 11, and a plurality of second guide rollers 26 supported rotatably around the vertical axis and which come in contact with the side surface of the respective rails 11 from the outside of the transversal direction with respect to both rails 11 (outside of the horizontal direction in FIG. 3). The guide rollers 24, 26 are an example of the support mechanism for supporting the platform body 20 (and therefore the platform car 12) movably in the longitudinal direction relative to the respective rails 11. Due to the guide rollers 24, 26 that come in contact with the upper surface and side surface of the rails 11, the platform car 12 is movably supported along the rails 11 in a state where the displacement is restrained only in the transversal direction with respect to the rails 11. That is, the platform car 12 can be detached from the rail 11 along a vertical direction (opposing direction that faces the surface of the base 10 to which the rails 11 are fixed). Accordingly, the guide rollers 24, 26 as the support mechanism enable the platform car 12 to be lifted up and removed from the rail 11 during maintenance.

The foregoing linear motor 14 is provided with a stator 32 disposed on the base 10, and a mover 34 fixed to the platform car 12.

The stator 32 is disposed at an approximately intermediate position between both rails 11. The stator 32 is also provided with a yoke (not shown) extending parallel with the respective rails 11 in the longitudinal direction thereof, and a plurality of tabular permanent magnets 33 disposed on the yoke along the longitudinal direction thereof. The permanent magnets 33 are placed in an alternating arrangement so that the upper surface of the adjacent magnets 33 has opposite poles.

The mover 34 is fixed to the lower surface of the platform body 20 so as to face the stator 32. The mover 34 is provided with a comb-shaped core (iron core) 34a including a base part extending along the stator 32 and a plurality of suspended parts which are suspended from the base part. The mover 34 is also provided with an electromagnet configured from a plurality of coils 34b which are wound around the plurality of suspended parts. The mover 34 is fixed to the platform body 20 so that a gap G of a predetermined size is formed between the mover 34 and the stator 32 (permanent magnet 33).

The linear motor 14 is coupled to a drive controller (not shown). The drive controller includes a microprocessor for controlling the operation of the platform car 12, and a power supply unit for outputting an alternating current for driving the linear motor 14 based on the control of the microprocessor. The drive controller supplies the alternating current to the respective coils 34b of the mover 34. Supply of the alternating current is controlled based on the drive direction. Accordingly, the magnetic flux that works on the respective coils 34b changes in a non-constant manner. The mutual effect of this non-constant flux and the constant flux of the permanent magnet 33 continuously generates the propulsion between the stator 32 and the mover 34. The propulsion causes the platform car 12 to move along the rails 11. The gap G between the stator 32 and the mover 34 is set so that the foregoing propulsion is generated appropriately during the operation of the linear motor 14.

In some embodiments, the position detection device 16 is a so-called linear scale. The linear scale includes a linear scale body 52 fixed to the platform car 12 side, and a plurality of sensors 54 for reading information recorded on the linear scale body 52.

The linear scale body 52 is, for example, a magnetic scale in which position information is magnetically recorded along the moving direction of the platform car 12. Although not shown, the linear scale body 52 includes plural pieces of position signal information that is recorded in minute spacing, and origin position information recorded at each end thereof. The linear scale body 52 is fixed to the side surface portion of the platform body 20 via a stay 50 so that the recording surface of information is positioned on the base 10 side.

In some embodiments, the sensor 54 is configured from an MR sensor or a hole sensor capable of reading magnetically recorded information. The sensors 54 are disposed in an equal spacing at a plurality of positions in the moving direction of the platform car 12. The sensors 54 are respectively fixed to the side surface of the base 10 so as to face the linear scale body 52. Each sensor 54 reads each piece of position information and outputs the information to the drive controller in accordance with the movement of the platform car 12.

The foregoing gap variable mechanism 18 is disposed at a specific location in the range of motion of the platform car 12, and is adapted to change the gap G between the stator 32 and the mover 34 by displacing a part of the stator 32 of the linear motor 14 in a vertical direction. Since the gap G can be elongated, the gap variable mechanism 18 contributes to weakening the magnetic suction force between the stator 32 and the mover 34 and to lift up the platform car 12 when the platform car 12 is removed from the base 10.

As shown in FIG. 2, the gap variable mechanism 18 includes a lift 42 (supporting part of this invention) that is bridged laterally in the transversal direction with respect to the rail 11, and a drive mechanism (drive source of this invention) for driving the lift 42.

The lift 42 is disposed at a midway portion of the base 10. For example, at an intermediate position of the mobile region of the platform car 12, the lift 42 is disposed at the lower surface of the base 10. One end of the lift 42 is protruding outward from the side part of the base 10. A hexahedron mount part 44 is provided on an upper surface of the lift 42. The mount part 44 is located at a central part of the upper surface in the longitudinal direction of the lift 42. The mount part 44 is inserted into a through-hole 10a formed in the base 10. Fixed to the upper surface of the mount part 44 are a part of yoke (not shown) configuring a midway part of the stator 32 and a part of the plurality of permanent magnets 33. Specifically, the midway portion of the stator 32 is adapted to be separable from the remaining portion. Because it is fixed to the upper surface of the mount part 44, the midway part of the stator 32 can be moved vertically integral with the lift 42, so that the gap variable mechanism 18 changes the size of the gap G between a part of the stator 32 and the mover 34 based upon such vertical movements.

The foregoing drive mechanism is embodied with, for example, a bolt/nut mechanism. The drive mechanism includes a plurality of guide axes 40 fixed to the lower surface of the base 10 for guiding the lift 42 in a manner where it can be freely moved vertically, a nut member 43 fixed to the protruding portion of the lift 42, a threaded shaft 48 mated with the nut member 43 around the vertical axis, and a motor 46 for driving the threaded shaft 48. As the motor 46 rotates the threaded shaft 48, the lift 42 moves vertically along the guide axis 40.

The lift 42 is displaced between a reference position and a lowering position. The reference position refers to a position (or a position shown in FIG. 2) where the gap G, which is formed between the portion of the stator 32 that is fixed to the mount part 44 (for the sake of convenience, this portion is hereinafter referred to as the "displaced portion of the stator 32") and the mover 34, becomes equal to the gap G in the portions other than the lift 42. The lowering position is the position (position shown in FIG. 3) where the gap G is enlarged to a predetermined size by lowering the lift 42 from the reference position. The lift 42 at the lowering position elongates the gap G which enables an operator to easily pull away the platform car 12 in the opposing direction in a state where, for example, the linear motor 14 is stopped (state where the current supply is suspended) even if the remain of the magnetic suction force between the permanent magnet 33 of the displaced portion of the stator 32 and the platform car 12 (lower end of the plurality of suspended parts of the core 34a of the mover 34).

The operation and effect of the foregoing linear transport device are now explained.

When the linear transport device is driving, the motor 46 is driven in advance to set the lift 42 to the reference position, and set the gap G between the mover 34 and the stator 32 to a given size along the entire moving range of the platform car 12. In this state, the alternating current is supplied to the respective coils 34b of the mover 34. The alternating current supply causes to generate a non-constant flux in the respective coil 34b. Based on the mutual effect of the non-constant flux and the constant magnetic flux of the permanent magnet, as described above, the propulsion is continuously developed between the stator 32 and the mover 34. The platform car 12 moves along the rails 11 due to the propulsion. The platform body 20 of the platform car 12 is configured so that various tools and the like can be on board with fixing means such as a bolt. Accordingly, using this linear transport device in plants and the like, various tools can be carried within a given range based on the movement of the platform car 12, or various objects can be transported using such tools.

In maintenance or the like of the linear transport device, the platform car 12 can be removed the following process. Foremost, the platform car 12 is moved to a position of the displaced portion of the stator 32, and the linear motor 14 is stopped in this state (current supply to the mover 34 is suspended). In several embodiments, the home position where the platform car 12 stops is set as the displaced portion. Next, while the platform car 12 is still mounted on the rails 11, the motor 46 is driven to descend the lift 42 from the reference position to the lowering position so that the gap G between the displaced portion of the stator 32 and the mover 34 is elongated, as shown with the white arrow in FIG. 3. The platform car 12 is lifted up then, and thereby removed. If the linear motor 14 is merely stopped, it would be difficult to lift up and remove the platform car 12 due to the magnetic suction force generated between the core 34a of the mover 34 and the stator 32 (permanent magnet 33). On the contrary, if the gap G between the stator 32 and the mover 34 is elongated as described above, the foregoing suction force will decrease and the platform car 12 can thereby be lifted up and removed from the rail 11 without trouble.

In a post-maintenance, the gap G between the stator 32 and the mover 34 will be returned to the original gap G that is appropriate for driving the linear motor 14 by, for example, an inverse process in which the platform car 12 is returned on the rails 11 and then driving the motor 46 to reset the lift 42 to the reference position. The linear transport device can thereby be driven. Although the workability will be inferior to the foregoing process due to the generation of the magnetic suction force, the platform car 12 may be returned on the rails 11 after resetting the lift 42 to the reference position. The platform car 12 may also be returned on the rails 11 at a position other than the displaced portion.

After the maintenance, the linear motor 14 is driven to move the platform car 12 in a specific direction, and the origin signal information of the linear scale body 52 is read with one of the sensors 54. The current position of the platform car 12 is thereby detected and the subsequent control of the platform car 12 by the drive controller is enabled.

As described above, with the linear transport device of the present invention, since the platform car 12 is supported by the rails 11 in a manner where it can be detached in the vertical direction and a gap variable mechanism 18 is provided for elongating the gap G between the stator 32 and the mover 34 of the linear motor 14, the platform car 12, which is in process of removing, can be easily removed above the device by lifting up the platform car 12 from the rails 11 after elongating the gap G between the stator 32 and the mover 34 by the gap variable mechanism 18. Thus, even in the insufficient space around the device on the surface to which the base 10 is to be mounted, the platform car 12 can be removed without hindrance. In addition, it is no longer necessary to remove a stopper or the like (disassembly operation) which is required in the past process of removing the platform car 12. This results in the quick operation. Thus, according to this linear transport device, it is no longer necessary to occupy certain space around the device, while the platform car 12 can be removed more quickly with a small number of man-hours. Consequently, the maintenance can be efficient.

The linear transport device according to the second embodiment of the present invention is now explained.

Figure 4:
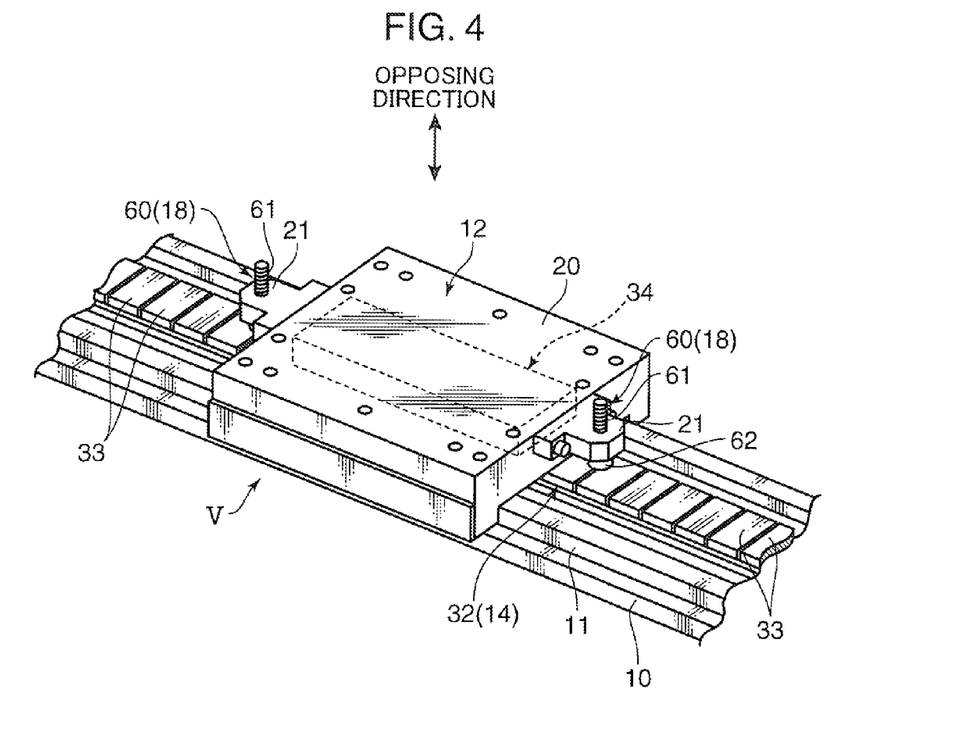
FIG. 4 is a perspective view showing the linear transport device (second embodiment) according to the present invention.
Figure 5:
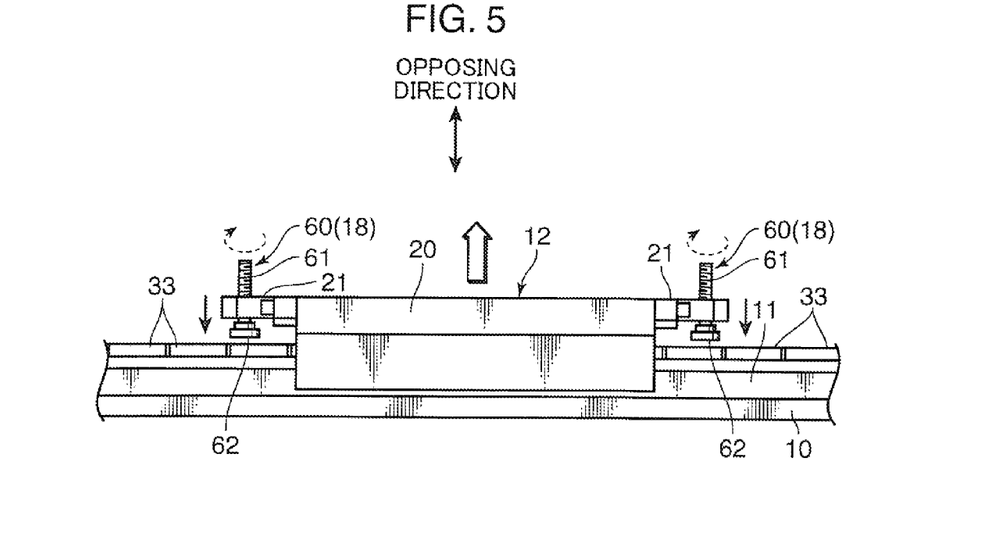
FIG. 5 is a side view showing the linear transport device.

FIGS. 4 and 5 show the linear transport device according to the second embodiment, wherein FIG. 4 is a perspective view showing the linear transport device, and FIG. 5 is a side view (arrow view in the V direction of FIG. 4), respectively.

The linear transport device according to the second embodiment differs from the configuration of the first embodiment in that it is provided with a manual gap variable mechanism 18 that is explained below in substitute for the motor-driven gap variable mechanism 18 explained in the first embodiment. Since the remainder of the configuration is basically the same as the first embodiment, the ensuing explanation will mainly refer to the configuration of the gap variable mechanism 18 as the point of difference.

The gap variable mechanism 18 according to the second embodiment is configured, as shown in FIG. 4 and FIG. 5, to lift up the platform car 12 from the base 10 based on the rotating operation of a pair of screw members 60 provided to the platform car 12.

Specifically, the platform body 20 is provided with a pair of flange parts 21, and the screw member 60 extending in the vertical direction are respectively mated with the internal threaded hole of the flange parts 21. Each screw member 60 includes a threaded shaft body 61 that is mated with the flange part 21 around the vertical axis and formed with a driver groove (not shown) at the leading end (upper end), and a sheet or shoe 62 that is mounted on the tip (lower end) of the threaded shaft body 61 in a state of being able to rotate relatively around the axis of the threaded shaft body 61. The respective screw members 60 are rotated to cause the shoe 62 to come in contact with the stator 32 (permanent magnet 33). If the screw members 60 are additionally rotated from the foregoing state, the reactive force thereof will, against the magnetic suction force between the stator 32 and the mover 34, cause the overall platform car 12 to be lifted up from the rails 11, as shown with the white arrow in FIG. 5. In other words, to elongate the foregoing gap G between the stator 32 and the mover 34 so as to reduce the magnetic suction force therebetween, the gap variable mechanism 18 of the second embodiment is so configured that the overall platform car 12 including the mover 34 is removed from the base 10 (rails 11) in the opposing direction. The screw member 60 may also be configured to come in contact with the base 10.

In the linear transport device of the second embodiment, as well as the first embodiment, the platform car 12 can be lifted up and removed. Thus, the same operation and effect as the first embodiment can be enjoyed.

In addition, according to the configuration of the second embodiment, since the gap variable mechanism 18 is configured such that the entire mover 34 is removed together with the platform car 12 from the base 10 (rails 11) in the opposing direction by rotating the screw members 60, there is an advantage in that the position of removing the platform car 12 will not be restricted in the relationship with the stator 32 as in the first embodiment and therefore the platform car 12 can be removed at an arbitrary position within the range of motion.

Moreover, with the second embodiment, since the gap variable mechanism 18 is of an extremely simple configuration where the screw members 60 are merely equipped with the platform car 12, there is also an advantage in that the foregoing operation and effect can be enjoyed while reducing manufacture costs.

The configuration of the linear transport device according to the foregoing first and second embodiments can be modified as described below.

For example, although the gap variable mechanism 18 of the first embodiment is configured to elongate the gap G between the stator 32 and the mover 34 by moving a part (displaced portion) of the stator 32, the gap variable mechanism 18 may be configured to move the overall stator 32 relative to the base 10 if the entire length, or the movable range of the platform car 12 is short. In this arrangement, since the gap G between the stator 32 and the mover 34 can be elongated regardless of the position of the platform car 12 in the moving range, the platform car 12 can be removed from the rails 11 at an arbitrary position in the moving range even with the type shown in the first embodiment.

Moreover, although both the first and second embodiments apply a coil-based linear motor 14 as the linear motor, it is needless to say that a permanent magnet-based linear motor may also be used. In application, since the stator will be configured from a core and a plurality of coils that are mounted thereon, the core and a part of the coils should be separated from the remaining portion and fixed to the mount part 44 of the lift 42 with respect to the gap variable mechanism 18 of the first embodiment. As for the gap variable mechanism 18 of the second embodiment, particularly in a case where the screw member 60 comes in contact with the stator, the screw member 60 will be adapted to come in contact with the portion of the core of the stator configured from a plurality of coils.

Moreover, although the gap variable mechanism 18 of the first embodiment employs the motor 46 as the drive source to vertically move the stator 32 based on a screw-insert mechanism, it is needless to say that a configuration with an actuator such as an air cylinder to directly move the lift 42 vertically may also be adopted. In fact, the specific configuration for the vertical movement of the stator 32 is not limited to the configuration of the first embodiment. In addition, the gap variable mechanism 18 merely needs to be able to elongate the gap G in comparison to the gap G in driving the linear motor. Therefore, it may also be adopted not only the configuration in which one of the stator 32 and the mover 34 is to be movable, but also a configuration in which both the stator 32 and the mover 34 are to be movable to change the gap G.

Figure 6:
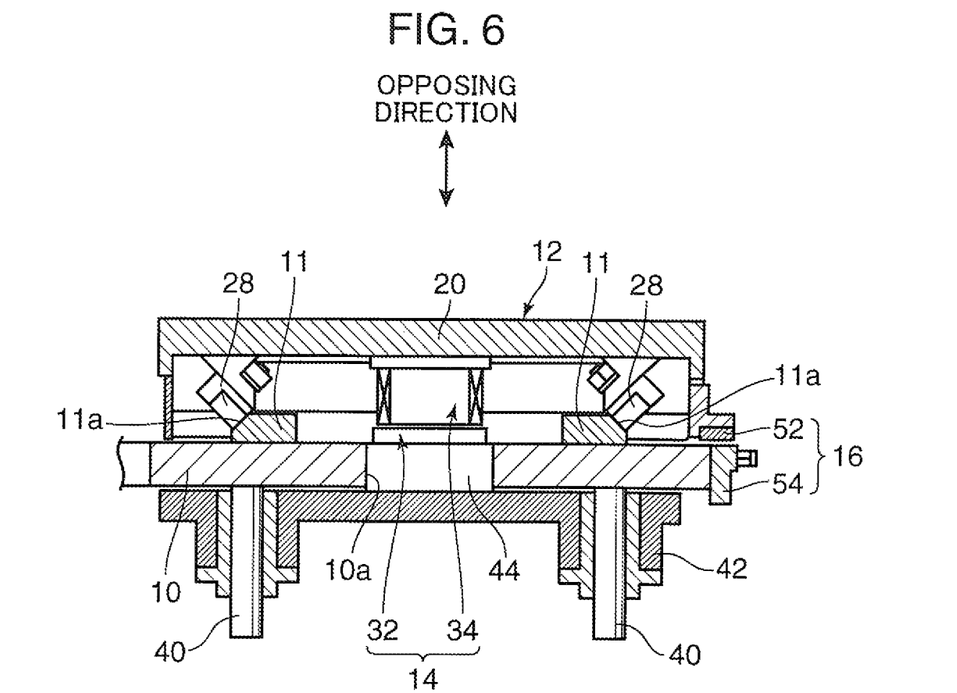
FIG. 6 is a longitudinal cross section showing another embodiment of the linear transport device according to the present invention.

Moreover, the first and second embodiments apply a pair of rails 11 with a rectangular cross section to allow the platform car 12 to be detached in the vertical direction (direction that is parallel to the row of the stator 32 and the mover 34) and subsequently provide the guide rollers 24, 26 to the platform car 12 that come in contact with the upper surface and side surface of the rails 11. However, as shown in FIG. 6, it is also possible to apply, for example, the respective rails 11 which include a slant guide surface 11a inclined downward from the inside to the outside in the transversal direction thereof (horizontal direction in FIG. 6). In the arrangement, each guide rail may be provided with only one guide roller (guide roller 28) which rotates freely around an axis adapted to be parallel with the slant guide surface 11a and to be orthogonal to the longitudinal direction of the rail 11 so that the guide roller 28 is rotatably contacting with the slant guide surface 11a to guide the platform car 12. In other words, the guide roller 28 in this configuration will concurrently perform the two functions; supporting the platform car 12 and preventing the platform car 12 from leaving in the transversal direction with respect to both rails 11, which are shared by the guide rollers 24, 25 in the respective embodiments. Thus, according to the configuration shown in FIG. 6, it is possible to reduce the number of guide rollers while supporting the platform car 12 relative to the rails 11 in a state of being detachable in the vertical direction, and there is an advantage in that the device can thereby be simplified and manufactured inexpensively.

Moreover, although the gap variable mechanism 18 of the second embodiment is configured so that the mover 34 is removed together with the platform car 12 from the base 10 (rails 11) in the opposing direction by rotating the screw members 60, the gap variable mechanism 18 may also be configured so that only the mover 34 is moved relative to the platform car 12 to elongate the gap G with the stator 32 in a state where the platform car 12 is stopped on the rails 11 (while the current supply to the respective coils 34b is suspended). Moreover, in the first and second embodiments, although the opposite surfaces of the stator 32 and the mover 34 were respectively horizontal, as shown in figures such as FIGS. 2 and 6, it is needless to say that these surfaces may be slanted or even perpendicular to the horizontal plane.

The linear transport device according to the third embodiment of the present invention is now explained.

Figure 7:
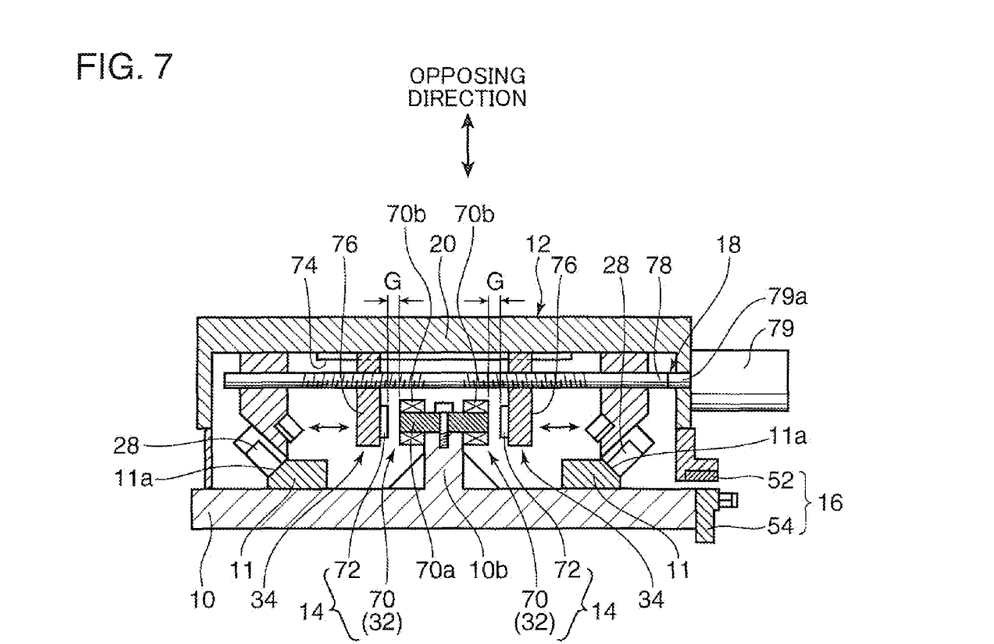
FIG. 7 is a longitudinal cross section (during normal operation) of the linear transport device (third embodiment) according to the present invention.

FIG. 7 shows a longitudinal cross section of the linear transport device according to the third embodiment. The linear transport device of the third embodiment shown in FIG. 7 differs from the configuration of the first embodiment with respect to the following points, and the remaining configuration is basically common with the linear transport device of the first embodiment.

Foremost, the structure shown in FIG. 6 is applied as the support structure of the platform car 12 relative to the rails 11. Moreover, a permanent magnet-based linear motor is applied as the linear motor 14, and the opposite surfaces of the stator 32 and the mover 34 of the linear motor 14 are vertical. That is, the stator 32 and the mover 34 face each other in the horizontal direction. As explained below, the gap variable mechanism 18 is configured to elongate the gap G between the stator 32 and the mover 34 by moving the mover 34 in the horizontal direction relative to the platform body 20.

The linear motor 14 is a permanent magnet-based linear motor as described above. Specifically, while the stator 32 is configured from an electromagnet 70 provided with a core (iron core) 70a and a coil 70b to be wound thereareound, the mover 34 is configured from a yoke (not shown) and a plurality of permanent magnets 72 fixed to the yoke and aligned with the longitudinal direction of the rails.

The linear motor 14 is a twin-structured motor having two pairs of the stator 32 and the mover 34, and includes two stators 32 disposed at the center part of the base 10 in the width direction (transversal direction with respect to both rails 11) and aligned with the width direction, and two movers 34 respectively facing the stators 32 from the outside in the width direction.

Each stator 32 includes a common core 70a, and a coil 70b that is wound around either end of the core 70a. The core 70a is formed in a comb shape having a base part extending along the longitudinal direction of the rails, and a plurality of protrusions respectively extending from the base part to either end in the width direction and aligned with the longitudinal direction of the rails. The respective coils 70b being wound around the foregoing protrusions configure two stators 32 having a plurality of electromagnets 70 aligned in a row at either end of the base part in the longitudinal direction of the rails. A plurality of bosses 10b aligned in a row with the longitudinal direction of the rails are raised from the center part of the base 10 in the width direction. The respective stators 32 are fixed to the base 10 as a result of the base part of the core 70a being mated with the bosses 10b.

Each mover 34 is supported to be movable in the width direction relative to the platform body 20. Specifically, two movable members 76, which are respectively movable in the width direction, are provided on the lower surface of the platform body 20 along the guide rail 74. The yoke and the permanent magnet 72 are respectively fixed to the inner walls of the movable members 76. Moreover, a threaded shaft 78 extending in the width direction is rotatably supported by the platform body 20. The threaded shaft 78 has a pair of threaded parts which form screws mutually reverse rotation with respect to the intermediate part of the threaded shaft 78. Each movable member 76 is mated with either threaded part of the threaded shaft 78, so that the threaded directions are mutually reversed. The threaded shaft 78 is coupled to an output shaft 79a of the motor 79 that is fixed to the base 10. Therefore, if the motor 79 is driven in a state where, for example, the platform car 12 is stopped at an arbitrary position on the rail 11, the respective movable members 76, and therefore the respective movers 34 move in a direction that is mutually opposite with respect to the width direction. In this embodiment, the foregoing guide rail 74, the movable member 76, the threaded shaft 78, the motor 79, and the like configures the gap variable mechanism 18, which is adapted to elongate the gaps G between the respective stators 32 and the respective movers 34 by driving the motor 78 in a predetermined direction (clockwise, for example) so that the respective movable members 76 (movers 34) move in a mutually separating direction.

In the linear transport device of the third embodiment, since it is also possible to elongate the gap G between the respective stators 32 and the respective movers 34 as described above and reduce the magnetic suction force between the respective stators 32 and the corresponding movers 34, the platform car 12 can be easily removed from the rails 11. In addition, the linear transport device can be driven by an inverse process: returning the platform car 12 onto the rails 11, and inversely driving the motor 79 to return the gap G between the respective stators 32 and the respective movers 34.

As evident from the embodiment shown in FIG. 2 and FIG. 3 and the embodiment shown in FIG. 7, the present invention can be applied to such a type that one of the electromagnet (70) and the permanent magnet 33 (72) configured from the core 34a (70a) and the coil 34b (70b) is provided to one of the stator 32 on the base 10 side and the mover 34 on the platform car 12 side and the other of the electromagnet (70) and the permanent magnet 33 (72) is disposed to the other of the stator 32 on the base 10 side and the mover 34 on the platform car 12 side. In the configurations, if the gap variable mechanism 18 is configured so that one of the stator 32 and the mover 34 is movably mounted on one of the base 10 and the platform car 12 in order to cause the gap G thereof to be variable in a state of stopping the platform car 12 on the rails 11, the platform car 12 can be easily removed from the rails 11.

The linear transport device according to the fourth embodiment of the present invention is now explained.

Figure 8:
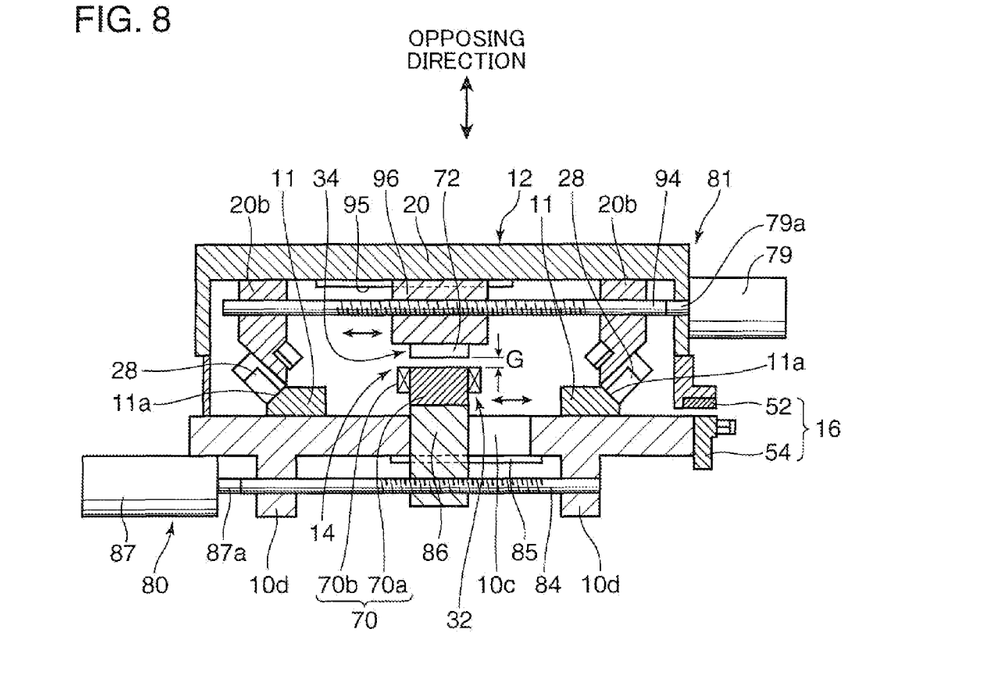
FIG. 8 is a longitudinal cross section (during normal operation) of the linear transport device (fourth embodiment) according to the present invention.

FIG. 8 shows a longitudinal cross section of the linear transport device according to the fourth embodiment. The linear transport device of the fourth embodiment shown in FIG. 8 differs from the configuration of the first embodiment with respect to the following points, and the remaining configuration is basically common with the linear transport device of the first embodiment.

Foremost, the structure shown in FIG. 6 is applied as the support structure of the platform car 12 with respect to the rails 11. Moreover, a permanent magnet-based linear motor is applied as the linear motor 14. In addition, a relative position variable mechanism is provided in substitute for the gap variable mechanism 18. The relative position variable mechanism changes the relative position between the stator 32 and the mover 34 to be variable by moving one of the stator 32 and the mover 34 or both the stator 32 and the mover 34 in a direction that is parallel to the opposite surfaces thereof. In the example of FIG. 8, first and second (two) relative position variable mechanisms 80, 81 are mounted on the linear transport device as the relative position variable mechanism.

The first relative position variable mechanism 80 is provided with a threaded shaft 84 that is disposed at the lower part of the base 10 at the intermediate position in the mobile region of the platform car 12 and which extends in the width direction, a guide rail 85 fixed to the lower surface of the base 10 and which extends parallel to the threaded shaft 84, a movable member 86 inserted into a slotted hole 10c, which is long in the width direction and formed in the base 10, and movably supported in the width direction along the guide rail 85, a motor 87 fixed to the lower surface of the base 10 for driving the threaded shaft 84, among other elements.

The threaded shaft 84 is rotatably supported at the lower part of the base 10 via a pair of boss parts 10d provided to the bottom surface of the base 10. The base end of the threaded shaft 84 is coupled with the output shaft 87a of the motor 87. The lower part of the movable member 86 is mated with the midway part of the threaded shaft 84.

The guide rail 85 reciprocally guides the movable member 86 in the width direction of the base 10.

A part of the stator 32 of the linear motor 14 is fixed to the upper end surface of the movable member 86. The stator 32 is configured from a comb-shaped core (iron core) 70a including a base part extending in the longitudinal direction of the rails 11 and fixed to the bosses and the like on the base 10 and a plurality of protrusions protruding upward from the base part, and a plurality of electromagnets 70 made from a plurality of coils 70b respectively wound around the plurality of protrusions. A part (midway portion) of the stator 32 is configured to be separable from the remaining portions. In other words, the separable midway portion of the stator 32 is fixed to the upper end surface of the movable member 86.

The second relative position variable mechanism 81 includes a threaded shaft 94 disposed at the lower part of the platform body 20 and extending in the width direction, a guide rail 95 extending parallel with the threaded shaft 94 and fixed to the lower surface of the platform body 20, a movable member 96 supported movably in the width direction along the guide rail 95, and a motor 97 fixed to the side surface of the platform body 20 for driving the threaded shaft 94, among other elements.

The threaded shaft 94 is rotatably supported by the boss parts 20b provided to the platform body 20. The base end of the threaded shaft 94 is coupled to the output shaft 97a of the motor 97. The upper part of the movable member 96 is mated with the threaded shaft 94.

The mover 34 of the linear motor 14 is fixed to the lower end surface of the movable member 96. The mover 34 includes a yoke (not shown) fixed to the movable member 96 and a plurality of permanent magnets 72 layered and fixed to the yoke and aligned with the longitudinal direction of the rails, and faces the stator 32 via a predetermined gap G.

In the linear transport device according to the fourth embodiment, if the motor 87 of the first relative position variable mechanism 80 is driven in a state where the platform car 12 is stopped on the rails 11, the stator 32 will move in the horizontal direction (rightward in the illustrated example)

while maintaining the predetermined gap G relative to the mover 34 (gap by which appropriate propulsion is generated during the operation of the linear motor 14). Moreover, if the motor 97 of the second relative position variable mechanism 81 is driven, the mover 34 will move in the horizontal direction (leftward in the illustrated example) while maintaining the predetermined gap G relative to the stator 32. Consequently, the opposite surfaces of the mover 34 (permanent magnet 72) and the stator 32 (core 70*a*) will become displaced relatively in the width direction (horizontal direction), and the area of the respective opposite surfaces that overlap in the vertical direction will decrease. Since the strength of the magnetic force that works from the mover 34 (permanent magnet 72) to the stator 32 (core 70*a*) changes in proportion (direction proportion) to the overlapping area of the respective opposite surfaces where the magnetic flux passes through, the magnetic suction force of the stator 32 and the mover 34 is reduced, as described above. As a result of reducing the foregoing area by displacing the mover 34 (permanent magnet 72) and the stator 32 (core 70*a*) in the width direction, it is possible to easily remove the platform car 12 from the rails 11.

After maintenance and the like, the linear transport device can be driven by returning the platform car 12 on the rails 11, subsequently driving the motors 87, 97 in the reverse direction, and resetting the mover 34 and the stator 32 to the reference position where they face each other in a predetermined maximum area. Note that the reset operation of disposing the stator 32 and the mover 34 can be performed before returning the platform car 12 on the rails 11.

In the foregoing fourth embodiment, since the respective opposite surface of the mover 34 (permanent magnet 72) and the stator 32 (core 70*a*) are merely displaced relatively in the width direction, a large moving load against the magnetic force is no longer required, and the compact motors 87, 97 with reduced performance can be applied.

In the linear transport device of the fourth embodiment in process of removing the platform car 12, only one of the foregoing first relative position variable mechanism 80 and the second relative position variable mechanism 81 needs to be operated. Meanwhile, if both relative position variable mechanisms 80 and 81 are operated, the platform car 12 can be removed more quickly. Moreover, although two relative position variable mechanisms 80, 81 are provided, it is needless to say that a construction having only one of the first relative position variable mechanism 80 and the second relative position variable mechanism 81 may also be sufficient.

In this embodiment, the first relative position variable mechanism 80 is configured to move a part of the stator 32 (portion fixed to the movable member 86) in the width direction in process of removing the platform car 12, it is necessary to stop the platform car 12 at a position corresponding to the movable member 86 of the relative position variable mechanism 80. However, in some embodiments in which the entire length, or the movable range of the platform car 12 is narrow, the platform car 12 can be removed from the rails 11 at an arbitrary position in the moving range by the first relative position variable mechanism 81 which is adapted to move the overall stator 32 in the width direction.

As explained above, a preferred mode of the present invention is provided with a rail fixed to a base, a platform car movably supported on the rail, a linear motor which includes a stator disposed on the base and a mover disposed on the platform car so as to face the stator. A permanent magnet is used as one of the stator and the mover and an electromagnet with a coil is used as the other of the stator and the mover. The linear motor is adapted to drive the platform car by generating the propulsion between the stator and the mover by means of current supply to the coil. A support mechanism is adapted to support the platform car on the rail detachably in an opposing direction along which the platform car faces a surface of the base to which the rail is fixed. A relative position variable mechanism adapted to displace the stator and the mover so as to reduce magnetic suction force which is generated between the stator and the mover in a state that the coil is not energized.

In process of removing the platform car, the foregoing linear transport device enables to change the relative positional relationship between the stator and the mover by the relative position variable mechanism, thereby reducing the magnetic suction force therebetween. In this manner, the platform car will be pulled away from the rail in the foregoing state and will be easily removed from the rail. Thus, even in the insufficient space around the device on the surface to which the base is to be mounted, the platform car can be removed without hindrance. In addition, it is no longer necessary to remove a stopper or the like (disassembly operation) which is required in the past process of removing the platform car 12. This results in the quick operation.

In a preferred mode, the relative position variable mechanism is a gap variable mechanism adapted to displace the stator and the mover relative to each other in an orthogonal direction which is orthogonal to an opposite surface of one of the stator and the mover so that the size of a gap between the stator and the mover adjusted to drive the platform car is elongated. In process of removing the platform car in accordance with this preferred mode, the gap variable mechanism is operated to elongate the gap between the stator and the mover so as to reduce the magnetic suction force therebetween, and subsequently the platform car will be pulled away from the rail. Then, the platform car can be easily lifted up and removed from the rail without being influenced by the foregoing suction force.

Preferably, the gap variable mechanism may include a supporting part for supporting one of the stator and the mover, and a drive source for moving the supporting part in the orthogonal direction. According to the preferred mode, since the operation of elongating the gap between the stator and the mover can be automated, the platform car can be easily and quickly removed with less work.

It would be reasonable to dispose the gap variable mechanism, which is adapted to displace the stator side, on the base side that is less restricted in terms of space in comparison to the platform car side. Furthermore, the gap variable mechanism may be adapted to displace the overall stator. In order to avoid a complex structure, however, the gap variable mechanism may preferably be adapted to displace, in the orthogonal direction, a part of the stator which is disposed at, for example, a specific location in a moving region of the platform car. According to the preferred mode, by locating the platform car at a position corresponding to the specific location of the stator and displacing the stator of such specific location, the foregoing magnetic suction force between the platform car (mover) and the stator can be reduced.

In the foregoing linear transport device, the stator and the mover may be configured so that the opposite surfaces thereof and the surface of the rail are mutually parallel, and the gap variable mechanism may be adapted to displace the overall platform car including the mover in the orthogonal direction.

Preferably, the gap variable mechanism in the foregoing linear transport device is configured to displace the mover relative to the platform car. According to this mode, the platform car can be detachable at an arbitrary position on the rail. In addition to this, the gap variable mechanism can be miniaturized because the output needed to change the distance between the mover and the stator is irreverent to the weight of the platform car.

The relative position variable mechanism in the foregoing linear transport device may be configured to displace at least one of the stator and the mover in a direction that is parallel to an opposite surface of one of the stator and the mover.

According to the foregoing configuration, since a large moving load for resisting the magnetic force working between the stator or the mover is no longer required, the relative position variable mechanism can be made compact with minimal performance.

According to the linear transport device of the present invention, since the platform car is supported by the rail in an opposing direction along which the platform car faces a surface of the base to which the rail is fixed, and a relative position variable mechanism is provided, the relative position variable mechanism is operated to reduce the magnetic suction force between the stator and the mover, and the platform car can be easily removed along the foregoing opposing direction. Accordingly, even in cases where sufficient space cannot be secure around the device on the surface to which the base is to be mounted, the platform car can be removed without hindrance. In addition, since it is no longer necessary to perform the disassembly operation of a stopper or the like in process of removing the platform car, the platform car can be removed more quickly with a small number of man-hours, and, consequently, the maintenance performance can be improved.

This application is based on Japanese Patent Application Serial No. 2009-252852, filed in Japan Patent Office on Nov. 4, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A linear transport device, comprising:
a rail fixed to a base;
a platform car movably supported on the rail;
a linear motor including a stator disposed on the base and a mover disposed on the platform car so as to face the stator, one of the stator and the mover is a permanent magnet and the other is an electromagnet with a coil, the linear motor adapted to drive the platform car by generating propulsion between the stator and the mover by means of current supply to the coil;
a support mechanism adapted to support the platform car on the rail detachably in an opposing direction along which the platform car faces a surface of the base to which the rail is fixed; and
a relative position variable mechanism including a support part and a drive source, the support part being disposed at a specific portion of the base to support a part of the stator at the specific portion, and the drive source being adapted to displace the part of the stator through the support part relative to the mover so as to reduce magnetic suction force that is generated between the stator and the mover in a state that the coil is not energized.

2. The linear transport device according to claim 1,
wherein the relative position variable mechanism is a gap variable mechanism adapted to displace the part of the stator relative to the motor in an orthogonal direction which is orthogonal to an opposite surface of one of the stator and the mover so that the size of a gap between the stator and the mover adjusted to drive the platform car is elongated.

3. The linear transport device according to claim 2,
wherein the gap variable mechanism includes a lift as the supporting part adapted to support the part of the stator.

4. The linear transport device according to claim 1,
wherein the relative position variable mechanism is configured to displace the part of the stator in a direction that is parallel to an opposite surface of one of the stator and the mover.

* * * * *